United States Patent
Hoenig et al.

(10) Patent No.: US 7,153,406 B2
(45) Date of Patent: Dec. 26, 2006

(54) CATHODIC ELECTRODEPOSITION COATING COMPOSITIONS AND PROCESS FOR USING SAME

(75) Inventors: Helmut Hoenig, Kumberg (AT); Erik Bambach, Unterpremstaetten (AT); Georg Pampouchidis, Graz (AT); Manfred Valtrovic, Graz (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 733 days.

(21) Appl. No.: 10/619,718

(22) Filed: Jul. 15, 2003

(65) Prior Publication Data

US 2005/0011763 A1    Jan. 20, 2005

(51) Int. Cl.
*C25D 13/10*    (2006.01)

(52) U.S. Cl. .................... 204/499; 204/489; 528/322

(58) Field of Classification Search ................ 204/499, 204/489; 528/322
See application file for complete search history.

(56) References Cited

U.S. PATENT DOCUMENTS

| 4,423,172 A | * | 12/1983 | Otsuki et al. ................ 523/454 |
| 5,702,581 A | | 12/1997 | Kerlin et al. |
| 5,905,103 A | | 5/1999 | Honig et al. |

* cited by examiner

*Primary Examiner*—Kishor Mayekar

(57) ABSTRACT

A cathodic electrodeposition coating composition which produces substantially pinhole-free coatings on galvanized surfaces, said composition comprising 0.2 to 8% by weight, based on the weight of resin solids in the composition, of at least one 5- or 6-membered cyclic imide having a (cyclo) alkyl or (cyclo)alkenyl residue comprising 4 to 12 carbon atoms on the imide nitrogen.

8 Claims, No Drawings

CATHODIC ELECTRODEPOSITION COATING COMPOSITIONS AND PROCESS FOR USING SAME

BACKGROUND OF THE INVENTION

The invention relates to electrodeposition coating compositions (i.e., coating compositions that can be applied by cathodic electrodeposition ("CED") process) as well as to a process for the CED coating of substrates having a galvanized surface.

CED is a process in which coatings are applied to substrates where the substrate acts as the cathode. When substrates having an at least partially galvanized surface undergo CED coating, surface defects frequently form within the CED coating layer that is deposited due to the formation of fine hydrogen blisters on the substrate. The hydrogen blisters, particularly after the CED coating layer has been baked, are visible as pinholes or so-called zinc cratering. The pinholes are usually still visible after subsequent coatings are applied. Thus, individual pinholes in the CED coating layer can only be eliminated by post-working such as sanding and post-coating with suitable repair coating agents. In this case, not only are quality deficiencies of the CED coating possible, but in particular the productivity of the CED coating process suffers. If the CED coating layer has a very large number of pinholes, post-processing is no longer possible and then the defectively coated substrate becomes scrap.

The problem of pinholes as outlined above becomes more pronounced as the deposition voltage is increased, in other words the number of pinholes per unit of area increases with the deposition voltage. Pinholes thus become a significant problem when coating substrates at high deposition voltage. CED coating of three-dimensional substrates such as, for example, automobile bodies, takes place at the highest possible deposition voltage in order to achieve the highest possible throwing power. Throwing power is understood to mean that ability of an electrodeposition coating agent to be deposited within voids of a three-dimensional substrate which is significant for effective corrosion protection. Accordingly, there is a need for CED coating compositions that produce substantially pinhole-free coatings, even at high deposition voltages.

SUMMARY OF THE INVENTION

The present invention provides a cathodic electrodeposition coating composition which produces substantially pinhole-free coatings on galvanized surfaces, said composition comprising 0.2 to 8% by weight, based on the weight of resin solids in the composition, of at least one 5- or 6-membered cyclic imide having a (cyclo)alkyl or (cyclo)alkenyl residue comprising 4 to 12 carbon atoms on the imide nitrogen.

In another aspect, the invention provides a process for coating substrates having an at least partially galvanized surface, said process comprising the electrodeposition on said substrate of a cathodic electrodeposition composition of this invention.

In a further aspect, the invention provides a process for making substantially pinhole-free coatings on substrates having an at least partially galvanized surface, the process comprising applying a cathodic electrodeposition coating composition of this invention to galvanized surface of the substrate.

DETAILED DESCRIPTION OF THE EMBODIMENTS

The CED coating compositions according to the invention produce substantially pinhole-free coatings on substrates having an at least partially galvanized surface. By "substantially pinhole-free" we mean that the number of pinholes in the coating is kept to a minimum. Thus, the term "substantially pinhole-free" should be understood to mean, e.g., no more than 5 pinholes visible to the unaided eye in a square meter area.

The CED coatings of this invention are aqueous coating compositions having a solids content of, for example, from 10 to 30 wt-%. The total solids content of the CED coating compositions consist of resin solids, pigments, extenders, other additives conventionally used in coating compositions and the at least one cyclic imide. The resin solids of the CED coating compositions consist of binder(s) and any optional cross-linking resin(s) used in the composition. Pigment paste resins optionally contained in the CED coating compositions are included with the binders. The binders may be self-cross-linking or externally cross-linking. If externally cross-linking binders are used, the CED coating compositions would also contain cross-linking agents.

At least some of the binders carry cationic substituents and/or substituents able to be converted into cationic groups. The cross-linking agents may also contain cationic groups. Examples of cationic groups include basic groups, preferably nitrogen containing basic groups, which may be present in quaternized form. In lieu of or in addition to cationic groups, groups which may be converted to cationic groups ("cationic convertible groups") may be used. Cationic convertible groups are those which form cationic groups when reacted with a neutralizing agent, such as organic acids, for example, formic acid, acetic acid, lactic acid or methane sulphonic acid. Examples of suitable groups include primary, secondary or tertiary amino groups and ammonium groups, e.g., quaternary ammonium, phosphonium and/or sulphonium groups. Cationic convertible groups may be present in completely or partially neutralized form.

The CED coating compositions according to the invention contain binders depositable by cathodic electrodeposition, preferably resins containing primary, secondary and/or tertiary amino groups and having amine values of around 20 to 250 mg KOH/g. The weight average molecular weight ($M_w$) of the binders is preferably around 300 to 10000. The resins may be converted into the aqueous phase after the quaternization or neutralization of at least some of the cationic convertible groups. Examples of such CED coating binders are aminoepoxy resins, aminoepoxy resins having terminal double bonds, aminoepoxy resins having primary OH groups, aminopolyurethane resins, amino group-containing polybutadiene resins and/or modified epoxy resin-carbon dioxide-amine reaction products as well as amino(meth)acrylic resins.

The CED coating binders carry functional groups, in particular hydroxyl groups, for example corresponding to a hydroxyl value of 30 to 300, preferably 50 to 250 mg KOH/g, which are able to cross-link chemically. The CED coating binders may be self-cross-linking, or they are used in a mixture with known cross-linking agents. Examples of such cross-linking agents are amino resins, blocked polyisocyanates, cross-linking agents having terminal double bonds, polyepoxy compounds or cross-linking agents containing transesterifiable groups.

For the preparation of the CED coating compositions, the cationic binders may be used as a CED coating binder dispersion which may optionally contain cross-linking agent. CED coating binder dispersions may be prepared by the synthesis of CED coating binders in the presence or absence of organic solvents and conversion into an aqueous dispersion by diluting with water the CED coating binders which have been neutralized with neutralizing agent. The CED coating binder(s) may be present in a mixture with one or more suitable cross-linking agents and be converted together with the latter into the aqueous dispersion. Organic solvent, where present, may be removed, for example by vacuum distillation, before or after conversion into the aqueous dispersion until the desired content is achieved.

The subsequent removal of solvents can be avoided, for example, if the CED coating binders are neutralized in the low-solvent or solvent-free state, for example, as a solvent-free melt at temperatures of, for example, up to 140° C., with neutralizing agent and are afterwards converted with water into the CED coating binder dispersion. It is likewise possible to avoid the removal of organic solvents if the CED coating binders are charged as a solution in one or more olefinically unsaturated monomers which are polymerizable by free radical polymerization, or the binder synthesis is carried out in, as the solvent, one or more monomers (for example styrene) which are polymerizable by free radical polymerization, and the solution is afterwards converted into an aqueous dispersion by neutralization with neutralizing agent and dilution with water, and the monomers which are polymerizable by free radical polymerization are polymerized out subsequently.

The at least one cyclic imide is added to the CED coating compositions in a quantity of from 0.2 to 8 wt-%, preferably 0.5 to 5 wt-%, based on the resin solids, as an anti-pinhole additive in coating layers deposited by cathodic electrodeposition therefrom on galvanized substrate surfaces. The effect mechanism which suppresses pin holing is unclear. It is presumed that when galvanized substrate surfaces are coated by cathodic electrodeposition from the CED coating compositions according to the invention, either less hydrogen gas forms and/or the hydrogen formed escapes in finer blisters as compared to compositions that lack the cyclic imide.

The 5- or 6-membered, preferably 5-membered, cyclic imides having a (cyclo)alkyl or (cyclo)alkenyl residue comprising 4 to 12 carbon atoms on the imide nitrogen may in particular be prepared by reacting, with elimination of water, a cyclic carboxylic anhydride with a primary monoamine having a (cyclo)alkyl or (cyclo)alkenyl residue comprising 4 to 12 carbon atoms or with an alcohol monoamine having a primary amino group and a (cyclo)alkyl or (cyclo)alkenyl residue comprising 4 to 12 carbon atoms.

The cyclic carboxylic anhydride on which the cyclic imide is based may be a monocyclic compound or a polycyclic system and, in each case, may be unsubstituted or comprise hydrocarbon substituents, preferably (cyclo)alkyl or (cyclo)alkenyl substituents, in particular alkyl or alkenyl substituents, in each case, for example, having up to 18 carbon atoms. Examples of carboxylic anhydrides suitable for the production of the cyclic imides are maleic anhydride, phthalic anhydride, succinic anhydride, dodecenylsuccinic anhydride and glutaric anhydride.

The N-(cyclo)alkyl or N-(cyclo)alkenyl residue, preferably N-alkyl or N-alkenyl residue, comprising 4 to 12 carbon atoms of the 5- or 6-membered cyclic imides may be substituted with one or more hydroxyl groups and is derived from a primary monoamine or alcohol monoamine having a primary amino group. Examples are n-butylamine, octylamine, 2-ethylhexylamine, coconut fatty amine and cyclohexylamine.

The reaction product of dodecenylsuccinic anhydride with 2-ethylhexylamine is particularly preferably used as the cyclic imide.

The preferably stoichiometric reaction of cyclic carboxylic anhydride and primary monoamine may be performed in an inert organic solvent, but preferably without solvents, for example, at temperatures of 50 to 140° C. Due to the exothermic nature of the reaction, addition of one reaction component to the other generally proceeds with cooling such that the lower end of the temperature range is initially used, whereupon, once addition is complete, the temperature is increased and water of reaction may be removed, optionally with additional application of vacuum, with the purpose of taking the reaction to completion. The course of the reaction may be monitored in conventional manner by determining the acid or amine value of the reaction mixture and the reaction is generally continued to a conversion of at least 90% (formation of at least 90% of the theoretical quantity of cyclic imide). Once the reaction is complete, the resultant cyclic imide may, if desired, for example, be converted into an organic solution, for example, a 20 to 50 wt. % solution. Glycol ethers such as methoxypropanol, ethylene glycol monobutyl ether or ethylene glycol monohexyl ether are in particular preferred for this purpose.

As explained in greater detail hereinbelow, the at least one cyclic imide may be added to CED coating compositions in different ways, for example at the outset during the preparation of the CED coating compositions, or subsequently, for example, immediately before or during use for CED coating.

The CED coating compositions may also contain pigments, extenders, solvents and/or additives conventionally used in coating agents. Examples of pigments are conventional inorganic and/or organic colored pigments and/or special-effect pigments such as, for example, titanium dioxide, iron oxide pigments, carbon black, phthalocyanine pigments, quinacridone pigments, metallic pigments and interference pigments. Examples of extenders are kaolin, talcum and silicon dioxide. The CED coating compositions according to the invention may also contain corrosion protective pigments.

The pigments and/or extenders may be dispersed in some of the binder and then ground in a suitable unit, for example a pearl mill, after which they are mixed with the outstanding portion of binder to completion. The CED coating compositions can then be prepared from this material—after neutralization—by dilution with water (one-component method). Alternatively, the pigmented CED coating compositions may be prepared by mixing a CED coating binder dispersion and a separately prepared pigment paste (two-component method). For this purpose, a CED coating binder dispersion is, for example, diluted further with water, and an aqueous pigment paste is then added. Aqueous pigment pastes are prepared by methods known to those skilled in the art, preferably by dispersion of the pigments and/or extenders in paste resins frequently used by those skilled in the art, which are conventional for these purposes.

The ratio by weight of pigment plus extender to binder plus cross-linking agent of the CED coating compositions is, for example, from 0:1 to 0.8:1, and for pigmented coating agents preferably between 0.05:1 and 0.4:1.

Further additives may optionally be used in the CED compositions. Such additives are, for example, wetting agents, neutralizing agents, leveling agents, catalysts, corrosion inhibitors, defoamers, light stabilizers, antioxidants, as well as conventional anti-crater additives. These additives may be used in amounts of, for example, 0.1 to 5 wt-%, based on the resin solids. The additives may be incorporated into the CED compositions in any manner, for example during binder synthesis, during the preparation of CED coating binder dispersions, by way of a pigment paste or also separately.

The CED coating compositions may also contain conventional solvents in quantities which are typically used for CED coating compositions. Such solvents are, for example, glycol ethers, such as butyl glycol and methoxypropanol, and alcohols, such as butanol. The solvent content of the CED coating compositions is, for example, from 0 to 5 wt-%, based on the CED coating bath, which is ready for coating.

The CED coating compositions may be prepared by the known processes for preparing CED coating baths, that is to say fundamentally both by means of the one-component and also by means of the two-component method, as described hereinabove.

The CED coating compositions may, for example, be prepared such that the at least one cyclic imide is mixed as such, for example, in finely pulverized form or as a solution in water and/or organic solvent, with the remaining constituents of the CED coating composition. The at least one cyclic imide can in this case be added at any point to the CED coating compositions. For example, it can be mixed with binder first before the further constituents are admixed.

The CED coating compositions may be prepared by the one-component method such, for example, that the at least one cyclic imide is present in the non-aqueous phase, and is converted (together with other constituents in the non-aqueous phase) into the aqueous phase by dilution with water. For example, pigments and/or extenders may be dispersed in some of the binder and/or cross-linking agent and then ground in a suitable unit, for example a pearl mill, after which they are mixed with the outstanding portion of binder and/or cross-linking agent to completion. In this case, the at least one cyclic imide may be contained in the binder and/or cross-linking agent used for dispersing and/or for completion. The CED coating compositions or baths can then be prepared from the material thus obtained—after neutralization—by dilution with water.

The CED coating compositions may also be prepared by the two-component method such that the at least one cyclic imide and cationic binders are present in the non-aqueous phase, and are converted into the aqueous phase by dilution with water after neutralization. In this case, a CED coating binder dispersion containing the at least one cyclic imide is obtained. Then, by mixing with a separate pigment paste a pigmented CED coating composition or bath can be prepared from a CED coating binder dispersion thus obtained.

Alternatively, when using the two-component method, it is also possible to work such that there is added to a CED coating binder dispersion an aqueous pigment paste which contains the at least one cyclic imide. The pigment paste may be prepared, for example, by mixing or emulsifying cyclic imide-containing binder and/or cross-linking agent with a pigment paste prepared previously by the dispersion of pigments and/or extenders in aqueous paste resin.

The at least one cyclic imide may also be added separately to CED coating compositions. For example, it is in this case also possible to carry out the separate addition subsequently, for example, as a corrective additive to CED coating baths which are ready for coating. The at least one cyclic imide may in this case be used as such or as an aqueous or organic solution, or it may, if necessary, be first converted into a water-dilutable form; e.g., as a constituent of an aqueous pigment paste, as a constituent of a water-dilutable binder composition, as part of an aqueous CED coating paste resin or with the aid of suitable emulsifiers.

CED coating layers can be deposited from the CED coating compositions according to the invention in conventional manner on electrically conductive substrates or electrically conductive substrate surfaces switched as the cathode, for example, to a dry film thickness of 10 to 30 μm, and baked at object temperatures of, for example, 150 to 190° C. The effect according to the invention is achieved if the electrically conductive substrates or electrically conductive substrate surfaces are substrates having an at least partially galvanized surface or are galvanized substrate surfaces. Substrates having an at least partially galvanized surface are electrically conductive substrates, in particular metallic substrates whereof the surface is partially or preferably completely galvanized, or they are substrates of composite construction which are composed of metallic component parts having a galvanized surface. Examples of other component parts which have no galvanized surface and can be assembled with galvanized parts to form a structure of composite construction are plastics parts and metal parts which are coatable by electrodeposition, in particular, for example, of steel, aluminum or magnesium and plastics parts. If the last-mentioned plastics parts are electrically conductive or equipped with an electrically conductive surface, they can likewise be coated by cathodic electrodeposition. The metallic substrates or component parts having a galvanized surface are preferably galvanized steel parts.

Galvanizing may be constituted by pure zinc, a zinc-nickel alloy or a zinc-iron alloy, and it may be applied to the metallic substrate surface, in particular steel surface, for example galvanically, as hot galvanizing or as a so-called galvannealed zinc layer. In the context of the present invention, galvanized surfaces should also be understood to include electrically conductive coatings applied to substrate surfaces, whereof the electrical conductivity results from a sufficiently high zinc dust pigment content in the coating.

Galvanized bodywork steel sheet is increasingly gaining ground in automobile construction. The CED coating compositions according to the invention are therefore suitable in particular in the automotive sector, for example for corrosion protective priming of automotive bodies or automotive body parts which are constructed in whole or in part of galvanized steel parts.

CED coating layers may be deposited on galvanized substrate surfaces from the CED coating compositions according to the invention, without the occurrence of pinholing as a defect in the CED coating layers thus produced. Here, suppression of undesirable pinholing is also ensured at higher deposition voltages.

EXAMPLES

Example 1

Preparation of a Cyclic Imide 3032 g of dodecenylsuccinic anhydride were placed in a suitable reaction vessel equipped with a stirrer, thermometer, condenser, dropping funnel and water separator and were heated to 70° C. 1471 g of 2-ethylhexylamine were then added within 90 minutes. An exothermic reaction occurred during addition of the amine. The temperature during the addition was maintained at a maximum of 75° C. by cooling.

Once addition was complete, the temperature was raised to 140° C. in 1 hour and the resultant water of reaction was removed by distillation (reaction time approx. 3 hours). Progress of the reaction was monitored by determining the acid value and heating was stopped at an acid value of 30 mg of KOH/g. A 40 wt. % solution was produced by addition of ethylene glycol monobutyl ether.

Examples 2 to 4 (Preparation of CED Coating Compositions)

Example 2 (Comparative Example)

A CED coating composition was prepared by mixing 1635 parts by weight of a dispersion containing CED coating binder and cross-linking agent (according to Example 3 a), b) and c1) of U.S. Pat. No. 5,702,581) and 269 parts by weight of an aqueous pigment paste (47 wt-% volatile constituents, 42.5 wt-% titanium dioxide, 0.5 wt-% carbon black and 10 wt-% resin solids, said resin solids being derived from a paste resin according to Example 1 of U.S. Pat. No. 5,905,103; acid content 18 milliequivalents formic acid per 100 g solids). A solids content of 20 wt-% and an acid content of 38 milliequivalents per 100 g solids was adjusted with the addition of deionized water and formic acid. The CED coating composition obtained had a ratio by weight of pigment to binder of 0.2:1.

Example 3 (According to the Invention)

Example 2 was repeated with the difference that, once the CED bath had been prepared, the cyclic imide solution according to Example 1 was added in a quantity such that the content of cyclic imide was 0.64 wt. %, relative to the resin solids content of the CED bath.

Example 4 (Comparative Example)

Example 2 was repeated with the difference that, once the CED bath had been prepared, ethylene glycol monobutyl ether was added in a quantity corresponding to the quantity of ethylene glycol monobutyl ether added in Example 3 as a constituent of the cyclic imide solution added in said Example.

Testing Results

In 10-liter baths of the CED coating compositions of Examples 2 to 4, throwing power boxes assembled from test sheets of galvanized bodywork steel and switched as the cathode are coated at different deposition voltages in each case for 2 minutes at 30° C., and are baked in each case for 30 min. at 180° C. (object temperature) after rinsing with deionized water.

The test results achieved with the CED coatings are set out in the Table.

| Example | Deposition voltage, Volts | External film thickness[1], μm | Corrosion line[2], cm | Pinholes[3] |
|---|---|---|---|---|
| 2a | 220 | 17 | 13.5 | None |
| 2b | 240 | 20 | 16 | 10 to 15 |
| 2c | 260 | 22 | 18.5 | >20 |
| 3a | 220 | 17 | 14 | None |
| 3b | 240 | 20 | 16.5 | None |
| 3c | 260 | 22 | 18 | 1 to 2 |
| 4a | 220 | 17 | 14 | None |
| 4b | 240 | 20 | 16 | 10 to 15 |
| 4c | 260 | 22 | 18 | >20 |

[1]CED coating film thickness on the outside of the throwing power box.
[2]The corrosion line was determined in accordance with VDA [German automotive industry] recommendation 621–180 as a measure of the throwing power achieved. The value given indicates the rust-free length in cm. The corrosion test was performed as a 240-hour salt spray test in accordance with DIN 53 167.
[3]Number of pinholes per square meter of area coated by cathodic electrodeposition.

The CED coatings of Examples 2a, b and c showed pinholes increasing in number with increasing deposition voltage. Same applies to the CED coatings of Examples 4a, b and c that were electrodeposited from a CED coating composition containing more ethylene glycol monobutyl ether than the CED coating composition used in Examples 2a, b and c. The CED coatings of Examples 3a, b and c that were electrodeposited from a CED coating composition containing the cyclic imide show the anti-pinhole effect of the invention; pinholes were eliminated at 240 V deposition voltage and substantially reduced at 260 V deposition voltage.

What is claimed is:

1. A cathodic electrodeposition coating composition which produces substantially pinhole-free coatings on galvanized surfaces,
said composition comprising an additive of 0.2 to 8% by weight, based on the weight of resin solids in the composition, of at least one 5- or 6-membered cyclic imide having a (cyclo)alkyl or (cyclo)alkenyl residue comprising 4 to 12 carbon atoms on the imide nitrogen.

2. The cathodic electrodeposition coating composition of claim 1, wherein the cyclic imide is the reaction product of a cyclic carboxylic anhydride and an aliphatic amine.

3. The cathodic electrodeposition coating composition of claim 2, wherein the cyclic imide is the reaction product of dodecenylsuccinic anhydride with 2-ethylhexylamine.

4. A process for the cathodic electrodeposition coating of a substrate having an at least partially galvanized surface, the process comprising the step of applying by cathodic electrodeposition coating composition to the at least partially galvanized surface, wherein the coating composition comprises an additive of 0.2 to 8% by weight, based on the weight of resin solids in the composition, of at least one 5- or 6-membered cyclic imide having a (cyclo)alkyl or (cyclo)alkenyl residue comprising 4 to 12 carbon atoms on the imide nitrogen.

5. The process of claim 4, wherein the substrate having an at least partially galvanized surface is selected from the group consisting of metallic substrates and composite constructions thereof.

6. The process of claim 5, wherein the substrate comprises galvanized steel.

7. The process of claim 6, wherein the substrate is selected from the group consisting of automotive bodies and automotive body parts.

8. A process for making substantially pinhole-free coatings on substrates having an at least partially galvanized surface, the process comprising applying by cathodic electrodeposition coating composition to the at least partially galvanized surface, wherein the coating composition comprises an additive of 0.2 to 8% by weight, based on the weight of resin solids in the composition, of at least one 5- or 6-membered cyclic imide having a (cyclo)alkyl or (cyclo)alkenyl residue comprising 4 to 12 carbon atoms on the imide nitrogen.

* * * * *